June 18, 1963  D. R. ANDREWS ETAL  3,093,984
COUPLING MECHANISM
Filed Dec. 1, 1960
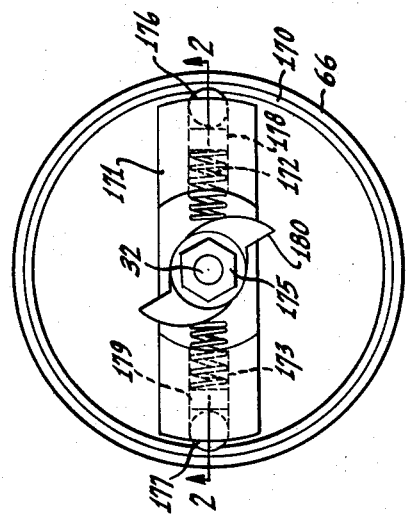
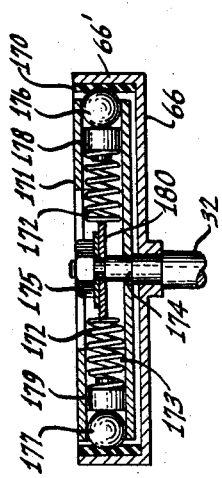
INVENTORS
DALLAS R ANDREWS &
JOHN B. KELLY
BY Morrisb Robbin
ATTORNEY United States Patent Office 3,093,984
Patented June 18, 1963

3,093,984
COUPLING MECHANISM
Dallas R. Andrews, Merchantville, and John B. Kelly, Haddonfield, N.J., assignors to Radio Corporation of America, a corporation of Delaware
Filed Dec. 1, 1960, Ser. No. 72,948
4 Claims. (Cl. 64—29)

The present invention relates to a coupling mechanism and has as its principal object to provide smooth coupling action between a drive member and a driven member.

Briefly described, the invention includes a rotatable element and a facing of flowable material, such as soft rubber, which is disposed in driving contact with the rotatable element. The rotatable element and the facing are individually disposed on the drive and driven members, respectively. Means are provided for biasing the rotatable member and the facing against each other such that the facing is continuously in a state of flow regardless of the relative speed of the drive member and the driven member, even if the relative speed is zero. The coupling action is smoother than possible with known coupling devices since transitions between static and dynamic frictional coupling in the mechanism according to the invention are eliminated due to the continuous state of flow of the facing.

The invention itself, both as to its organization and method of operation, as well as additional objects and advantages thereof, will become more fully apparent from a reading of the following description in connection with the accompanying drawing, in which:

FIG. 1 is a plan view of a coupling mechanism according to the invention; and

FIG. 2 is a sectional view taken along the line 2—2 in FIG. 1.

The coupling mechanism embodying the present invention serves to couple a wheel 66 to a shaft 32 on which the wheel is disposed to rotate freely and illustrated in FIGS. 1 and 2. This mechanism is in the nature of a clutch, but it differs from the usual clutch in that there is continuous slippage in the mechanism during its operation. For convenience, however, it will be called a clutch herein.

One of the most serious problems in tape reeling systems arises from irregular action due to oscillation or vibration in the clutches which couple the reeling devices to their drive members. It has been found that such oscillation is caused by the difference between the static and dynamic friction which produces a non-linear action when clutching action is initiated and when clutching action is terminated. This non-linearity occurs in both the forward and backward directions of motion of the coupled members and results in a negative frictional resistance. This negative frictional resistance produces vibration at some frequency, depending upon the mechanical constants of the clutching system. In the illustrated clutch, this non-linearity is reduced by minimizing or eliminating the difference between the static and dynamic friction through the use of a flowable material as a clutch facing. This flowable material is shown as a sleeve 170 lining the inner surface of a cylindrical flange 66' around the outer periphery of the wheel 66.

The clutch mechanism also includes a bar 171 which is disposed within the confines of the flange 66'. The bar 171 is countersunk and internally bored to provide diametrically opposed passages 172 and 173 which extend longitudinally therethrough in a direction radially of the wheel 66. The end of the shaft 32 has a shoulder 174 on which the bar 171 rests. The end of the shaft 32 is also threaded and a nut 175 holds the bar 171 fixedly on the shaft 32. A pair of balls of hard material, such as steel balls 176 and 177, are disposed in passages 172 and 173. These steel balls are biased toward the facing sleeve 170 by means of spring biased slugs 178 and 179. The bias on the balls 176 and 177 is adjustable by means of a wing cam 180 which is disposed around the shaft 32 and held on the bar 172 by means of the nut 175. The bias on the balls 176 and 177 determines the maximum amount of torque which can be transferred between the wheel 66 and the shaft 32.

The sleeve 170 is desirably made of soft rubber. However, any resilient material, such as a resilient plastic, may be used. The balls 176 and 177 cause the material of the sleeve to flow as the sleeve 170 rotates. Flow also occurs even when the shaft 32 and wheel 66 are not moving relative to each other. The amount of flow depends upon the speed of the wheel 66 with respect to the shaft 32. It should be noted that the material of the sleeve 170 is caused to flow as distinguished from merely being compressed. The balls roll on the facing and cause flowing of the rubber. Slippage occurs since the speed of the balls is different from the speed of the facing. The greater the torque transferred through the clutch, the more the rubber facing 170 is caused to flow or be displaced from the vicinity of the balls 176 and 177. The rubber is always in a condition of stress. Thus, no static frictional condition exists in the clutch even when the wheel 66 is stopped. There is always a dynamic frictional coupling between the shaft 32 and the wheel 66 through the balls 176 and 177 and the sleeve 170. This dynamic frictional coupling provides a force which varies linearly from stop through the speed range of the clutch.

From the foregoing description, it will be apparent there has been provided an improved clutch which provides smoother operation than known clutch devices. While only one embodiment of a mechanism provided in accordance with the invention has been described, variations in the mechanism, within the scope of the invention, will become apparent to one skilled in the art. Accordingly, it is intended that the foregoing be considered illustrative and not in any limiting sense.

What is claimed is:

1. A clutch mechanism which comprises a wheel having a cylindrical flange around the outer periphery thereof, a facing of flowable material lining the inner surface of said flange, a shaft, said wheel being disposed to rotate freely about said shaft, a member mounted for rotation with said shaft and being disposed within the confines of said cylindrical flange, said member having a passage therein extending in a direction radially of said wheel, a ball disposed in said passage at the end of said member which faces said flange, and a spring also disposed in said passage for biasing said ball into contact with said facing to indent said facing thereby causing the material thereof continuously to flow.

2. The invention as set forth in claim 1 including a cam pivotally mounted around said shaft, said spring being disposed between the surface of said cam and said ball whereby the bias exerted by said spring upon said ball is adjustable by pivoting said cam.

3. The invention as set forth in claim 1 wherein said facing is made of resilient rubber.

4. A clutch mechanism which comprises a wheel having a cylindrical flange around the outer periphery thereof, a facing of flowable material lining the inner surface of said flange, a shaft, said wheel being disposed to rotate freely about said shaft, a member mounted for rotation with said shaft and being disposed within the confines of said cylindrical flange, said member having a passage therein extending in a direction radially of said wheel, a rotatable member disposed in said passage at the end of said first named member which faces said flange, and a spring also disposed in said passage for biasing said rotatable member into contact with said facing to indent said facing thereby causing the material thereof continuously to flow.

References Cited in the file of this patent

UNITED STATES PATENTS

| | | |
|---|---|---|
| 1,125,739 | Schneider | Jan. 19, 1915 |
| 2,881,602 | Baker et al. | Apr. 14, 1959 |
| 3,004,411 | Bugel | Oct. 17, 1961 |

FOREIGN PATENTS

| | | |
|---|---|---|
| 834,481 | Germany | Mar. 20, 1952 |